United States Patent [19]

Seibert

[11] Patent Number: 4,766,988
[45] Date of Patent: Aug. 30, 1988

[54] CIRCUIT ARRANGEMENT FOR CONTROLLING THE ENGAGEMENT AND DISENGAGEMENT OF A CLUTCH

[75] Inventor: Wolfram Seibert, Darmstadt, Fed. Rep. of Germany

[73] Assignee: Alfred Teves GmbH, Frankfurt am Main, Fed. Rep. of Germany

[21] Appl. No.: 45,171

[22] Filed: Apr. 23, 1987

Related U.S. Application Data

[63] Continuation of Ser. No. 768,865, Aug. 23, 1985, abandoned.

[30] Foreign Application Priority Data

Aug. 23, 1984 [DE] Fed. Rep. of Germany ....... 3430983

[51] Int. Cl.$^4$ .............................................. B60K 41/28
[52] U.S. Cl. .................................. 192/0.055; 180/197; 192/0.094
[58] Field of Search ................. 192/0.03, 0.033, 0.044, 192/0.055, 0.072, 0.076, 0.094, 0.096, 0.032, 13 R; 364/426; 180/197

[56] References Cited

U.S. PATENT DOCUMENTS

| | | | |
|---|---|---|---|
| 3,610,362 | 10/1971 | Toyama et al. | 180/197 |
| 3,863,730 | 2/1975 | Wakamatsu et al. | 180/197 |
| 3,972,568 | 8/1976 | Fleischer | 303/111 X |
| 4,084,672 | 4/1978 | Avins | 192/0.055 |
| 4,345,796 | 8/1982 | Reinecke | 303/111 X |
| 4,408,293 | 10/1983 | Avins | 364/426 |
| 4,418,966 | 12/1983 | Hattwig | 303/111 X |
| 4,451,096 | 5/1984 | Gygax | 303/111 X |
| 4,456,106 | 1/1984 | Schneider | 192/0.055 |
| 4,484,653 | 11/1984 | Horikoshi et al. | 364/426 X |
| 4,491,919 | 1/1985 | Leiber | 364/426 |
| 4,509,628 | 4/1985 | Junginger et al. | 192/0.094 |
| 4,589,511 | 5/1986 | Leiber | 180/197 |

FOREIGN PATENT DOCUMENTS

| | | | |
|---|---|---|---|
| 8495 | 3/1980 | European Pat. Off. | 192/0.033 |
| 22621 | 2/1979 | Japan | 192/0.044 |
| 15225 | 2/1979 | Japan | 192/0.072 |
| 1405787 | 9/1975 | United Kingdom . | |
| 1449543 | 9/1976 | United Kingdom . | |
| 1543386 | 4/1979 | United Kingdom . | |
| 1582555 | 1/1981 | United Kingdom . | |
| 2056595 | 3/1981 | United Kingdom | 192/0.094 |
| 1599526 | 10/1981 | United Kingdom . | |
| 2080910 | 2/1982 | United Kingdom . | |
| 2117139 | 10/1983 | United Kingdom . | |
| 2118267 | 10/1983 | United Kingdom . | |

Primary Examiner—Rodney H. Bonck
Attorney, Agent, or Firm—James B. Raden; Robert P. Seitter

[57] ABSTRACT

A circuit arrangement for controlling the engagement and disengagement of a clutch (8) in the drive connection (2–5) of an automotive vehicle is equipped with transducers (19–22, 51, 52, 53) and with electronic circuits (33) for the logical combination and processing of the signals, and with switching valves (36, 48) which may be fed with the output signals of the circuits (33) and through which the clutch (8) may be operated or locked in the engaged or disengaged position in dependence on driving conditions or rather on measured values characteristic of the driving dynamics and on controlling conditions of the engine.

2 Claims, 1 Drawing Sheet

CIRCUIT ARRANGEMENT FOR CONTROLLING THE ENGAGEMENT AND DISENGAGEMENT OF A CLUTCH

This application is a continuation of application Ser. No. 768,865, filed Aug. 23, 1985 and now abandoned.

BACKGROUND OF THE INVENTION

This invention relates to a circuit arrangement for controlling the engagement and disengagement of a clutch provided in the drive connection of an automotive vehicle and equipped with an actuator or servomotor communicating with an auxiliary energy source.

It is known to equip the disengagement clutch between engine and gear box with a servomotor or actuator and to take the actuating force from an auxiliary electric or hydraulic energy source. On the one hand, this saves the drive from applying the pedal force for the release of the clutch. On the other hand, it becomes possible to control the engagement and disengagement of the clutch by an electric signal automatically generated, for example, by means of a simple electric switch when the gear shift lever is touched or rather when shifting gears. An automatic uncoupling of the engine during the thrust operation for the purpose of reducing the fuel consumption may likewise be realized by means of such a disengagement clutch caused by an electric signal to engage and disengage. Thus, in this way, the clutch performs the function of a free-wheel.

Under certain circumstances the torques transmitted by the driving engine to the wheels by way of the drive connection impair the driving behavior and the driving stability of the vehicle. For instance, in certain situations, this applies to the control of the brake slip or traction slip by means of slip-controlling brake systems. Therefore, circuits have been developed which automatically uncouple the driving engine from the wheels upon the actuation of the brake pedal or when there is a slip control signal. However, among other things, this is disadvantageous in that a reacceleration of the vehicle (for example, for swerving around an obstacle) is not possible at all or not until after a time delay.

It is thus an object of this invention to improve the driving behavior of a vehicle in general, the driving stability in certain situations, and also the efficiency or the driving comfort by means of the automatic engagement and disengagement of the disengagement clutch between the driving engine and the wheels.

SUMMARY OF THE INVENTION

It has been found out that this object is achieved by a circuit arrangement of the type referred to above, the special feature of which comprises transducers as well as electronic circuits of the logical combination and for the processing of the signals registered by the transducers, and further has switching means which may be fed with the output signals of the electronic circuits and by means of which the clutch may be operated and/or locked in the engaged or disengaged position as a function of driving conditions or on measured values characteristic of the driving dynamics and/or the correcting conditions of the engine.

According to an advantageous embodiment of this invention sensors for the registering of the rotational behavior of the vehicle's wheels and/or of the driving axles are provided as transducers. The sensors generate signals with a frequency proportional to the velocity and feed said signals to the circuits. By means of logical combination, differentiation, etc., it is possible to derive signals by means of the circuits, with the signals being proportional to the vehicular velocity, and to the vehicular deceleration and acceleration. The signals are then expediently compared in the circuits with predetermined limit values or switching thresholds.

According to further embodiments of this invention, transducers are provided for registering the throttle valve position of the vehicle's engine and/or of the brake pedal position of the vehicle. Further, a transducer may be provided for registering the speed of the automotive vehicle's driving engine.

Further, it is advantageous to provide the switching means of the inventive circuit arrangement in the form of electromagnetically operable multi-directional valves directly or indirectly controlling the pressure medium flow from an auxiliary hydraulic pressure source to an actuating or slave cylinder engaging and disengaging the clutch.

According to a further embodiment, the inventive circuit arrangement adopts the mode of operation of a free-wheel and effects a disengagement of the clutch in the thrust operation of the automotive vehicle. Contrary to a traditional free-wheel, values characteristic of the driving dynamics such as vehicular velocity, deceleration, etc. are taken into consideration in the logical combination or rather when deciding on the operation of the free-wheel. The disengagement of the clutch is caused by a circuit arrangement in accordance with the present invention only when the throttle valve in the carburetor of the automotive vehicle's driving engine is closed, and at the same time, there is no brake-application signal, and the instantaneous velocity is below a predetermined velocity limit value. Further, a disengagement of the clutch may be effected during freewheeling, i.e. when the speed of the driving engine falls below a predetermined speed.

According to a further embodiment, the inventive circuit arrangement shuts off the driving engine after the disengagement of the clutch when the vehicle is at a standstill and/or during freewheeling. In doing so, if necessary, it is required that a delay time elapse between the disengagement of the clutch and the disconnection.

The inventive circuit arrangement may be combined with a circuit for controlling a slip-controlled brake system, in particular the transducers, the electronic circuits for the combination and processing of the signals corresponding to the measured values, and the auxiliary energy source being jointly available both for the actuation of the clutch and for slip control.

The electronic circuits may also be provided in the form of one or of several programmable circuits, in particular in the form of microcomputers or microcontrollers.

This invention is essentially based on the finding that, in some respects, the driving behavior of a vehicle may be improved considerably by the automatic disengagement and engagement of the clutch at certain times or as a function of measured values characteristic of the driving dynamics and/or on controlling conditions of the engine. This progress, in particular when combined with slip-controlled brake systems, may be achieved without any additional effort worth mentioning as in such systems the required electronics, part of the transducers, and the auxiliary energy source are provided anyhow and thus are also available for other functions, namely for controlling the clutch.

BRIEF DESCRIPTION OF THE DRAWING:

Any further characteristics, advantages, and applications will become evident from the following description of embodiments of this invention, reference being made to the accompanying drawing wherein.

DETAILED DESCRIPTION

Figure 1:
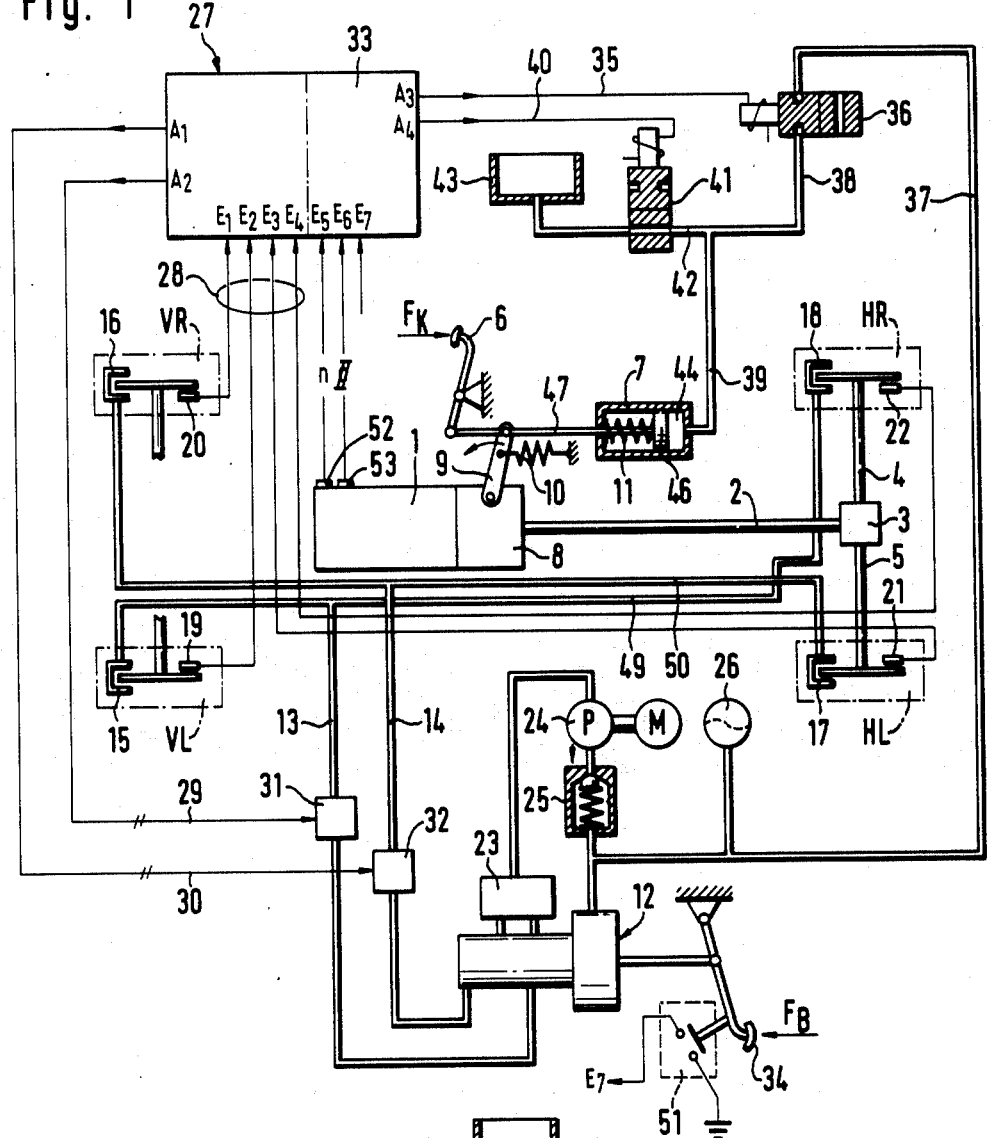
FIG. 1 is the schematic representation of the special design and of the circuit diagram of a circuit arrangement of the inventive type in combination with a slip-controlled brake system.

In FIG. 1, the front wheels VR, VL and the rear wheels HR, HL of an automotive vehicle are symbolically illustrated. The rear wheels HR, HL of said vehicle are driven by an internal combustion engine 1 by way of a drive connection consisting of a cardan shaft 2, a differential 3, and of two half axles 4, 5. A disengagement clutch, operable not only by way of a clutch pedal 6 but also by way of an actuating cylinder or slave cylinder 7, is marked 8. In the illustrated rest position of the clutch 8, it is engaged. A return spring 10 possibly aided by a return spring 11 in the actuating cylinder 7, keeps the clutch actuating lever 9 in the represented position.

The main parts of a slip-control hydraulic brake system are likewise represented in FIG. 1 as in this embodiment of this invention the circuit arrangement for controlling the clutch is combined with the circuit arrangement for slip control or rather for controlling this brake system.

In this case, said brake system consists of a dual-circuit hydraulic braking pressure generator 12 the two brake circuits of which are communicating with the wheel brakes 15, 18; 16, 17 of one diagonal at a time by way of a respective hydraulic connection line 13, 14 as well as by way of the hydraulic diagonal lines 49, 50. As usual, a pressure compensation reservoir 23 and an auxiliary energy supply system are associated with the braking pressure generator 12. Said auxiliary energy supply system consists of an electric-motor-driven hydraulic pump 24, a non-return valve 25 and a hydraulic accumulator 26.

The rotational behavior of the individual vehicle wheels is registered in the embodiment of this invention, described here, by means of inductive transducers 19, 20, 21, 22. The frequency of the output signals of these transducers is proportional to the rotational velocity of the individual wheels. By way of the indicated multiple line 28, the information on the rotational behavior of the wheels is fed to the inputs $E_1$ through $E_4$ of an electronic control unit 27 containing circuits for the processing and logical combination of all input signals and for the generation of control signals. By way of the signal lines 29, 30, braking pressure modulators 31, 32 are connected to the outputs $A_1$, $A_2$ of the control unit 27. Said braking pressure modulators 31, 32 are inserted into the hydraulic circuits of the braking pressure generator 12. For the purpose of controlling the wheel slip in dependence on the control unit signals upon the development of a lock-up danger, said braking pressure modulators 31, 32 are keeping the braking pressure constant, reducing it and, if necessary, reincreasing it. As indicated, the two lines 29, 30 may be multiple lines as the braking pressure modulators 31, 32 generally contain several valves which the control unit 27 must control independently of one another.

The inventive circuit arrangement, here designed as a part of the control unit 27 and symbolically represented by the part 33 separated by a broken line, controls the engagement and disengagement of the clutch 8 in dependence on several measured values characteristic of the driving dynamics and on controlling conditions of the driving engine 1. The information on the rotational behavior of the wheels which acts on the inputs $E_1$-$E_4$ of the control unit 27 is also evaluated for the control of the clutch. By way of the inputs $E_5$ through $E_7$, by means of a switch 51, of a transducer 53 registering the throttle valve position, and of a speed sensor 52, the circuit arrangement additionally receives signals of the speed n of the driving engine 1 ($E_5$), of the throttle valve position ($E_6$), and of the actuation of the brake pedal 34 ($E_7$). A command to disengage the clutch 8 is emitted in the form of an electric change-over command to an electromagnetically operable 2/2-way valve 36 by way of the output $A_3$ and by way of the electric signal line 35. Said 2/2-way valve 36 is inserted into the pressure medium path 37, 38, 39 connecting the auxiliary energy source 24 through 26 with a working chamber 44 in the slave cylinder 7. In the rest position said 2/2-way valve 36 shuts off the pressure medium flow. At the same time, by means of a signal at the output $A_4$ of the circuit arrangement 33 and by way of a signal line 40, a second 2/2-way valve 41 is switched over. Thus there is an interruption of the pressure medium path 39, 42 from the working chamber 44 to a pressure compensation reservoir 43 which may form part of the reservoir 23.

As long as the valve 41 is in the illustrated rest position and thus the communication from the working chamber 44 to the compensation reservoir 43 is open there will be no influence on the position of the clutch 8 by the actuating cylinder or slave cylinder 7. Apart from the relatively small force of the return spring 11, the piston 46 in the actuating cylinder 7 does not provide any resistance to a disengagement by means of a pedal force in the direction of the arrow $F_K$ since the working chamber 44 communicates with the pressure compensation reservoir 43 and thus may suck pressure medium.

If now, as a result of the logical combination of all the information or rather of all the signals fed to the electronic control unit 27, and in particular to the circuit arrangement 33 within the control unit, it is realized that in this situation it would be advantageous to disengage the clutch 8, consequently, immediately or after a delay time depending on the situation and on the type of control, there will be output signals in the lines 35, 40. Said output signals will lead to a change-over of the multi-directional valves 36, 41. Thereby hydraulic pressure is supplied into the working chamber 44 of the actuating cylinder 7. Said hydraulic pressure displaces the piston 46 which, on its part, by way of the push rod 47, displaces the cluch actuating lever 9 and thereby effects the disengagement of the clutch 8, thus finally the driving engine of the automotive vehicle being uncoupled from the drive connection 2 through 5. After the valves 36 and 41 have switched back, after the interruption of the hydraulic communication towards the auxiliary energy source 24 and 26, and after the reconnection of the chamber 44 to the compensation reservoir 43 the springs 10 and 11 reestablish the illustrated position in which the clutch is engaged.

Figure 2:
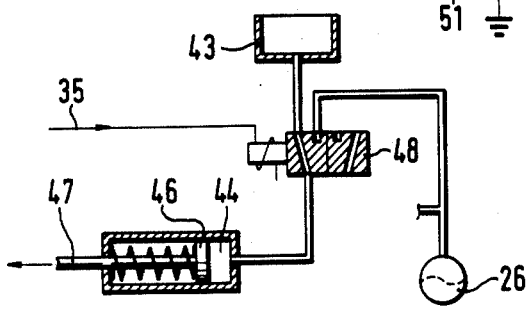
FIG. 2 is a further embodiment of a detail of the arrangement according to FIG. 1, the type of representation being the same.

In the embodiment according to FIG. 2 a 3/2-way valve 48 was used in place of the two b 2/2-way valves 36, 41. By way of said valve 48 the working chamber 44 of the actuating cylinder 7 is communicating with the pressure compensation reservoir 43 when the valve is in the rest position, and with the hydraulic accumulator 26 when the valve is actuated. Otherwise, this embodiment corresponds to the arrangement of FIG. 1.

As indicated above, it is possible by means of the described circuit arrangement to realize the function of a free-wheel which, however, and this is very important, depends on measured values characteristic of the driving dynamics. Besides registering the velocity, deceleration or acceleration signals and switching thresholds among other things, above a certain vehicular velocity and/or above a vehicular deceleration of a certain amount, it is possible to enforce an engagement of the clutch.

Further, an automatic disengagement of the clutch might always be expedient if at the same time (i) the throttle valve is closed, (ii) the brake pedal is not applied, and (iii) the vehicular velocity is under a certain value.

The function of the known centrifugal clutches may likewise be realized by a suitable logical combination of the input signals of the inventive circuit arrangement. In this arrangement, the clutch is disengaged when the engine speed falls under, for example, 900–1200 revolutions per minute. Contrary to the known centrifugal clutches which are destroyed by overheating in case of misoperation this danger may very easily be avoided by a corresponding monitoring and logical combination of the signals.

Further, the inventive circuit arrangement permits fuel to be saved by rating the system such as to ensure that, after the disengagement of the clutch, the driving engine is shut off, all other measured values characteristic of the driving dynamics and fed into the logic having been considered. A combination with the known start-stop circuits presents itself.

In many situations the inventive circuit arrangement is likewise suited for supporting the brake-slip and traction-slip control. To this end, only a small effort has to be made, namely a corresponding rating of the logical signal combination. Thus, for example, on slippery road surfaces or rather in situations characterized by a small friction between the wheel and the road surface, by means of releasing the clutch it is possible to eliminate the unfavorable influence the engine's traction torque is exerting on control as well as the influence of drive connection vibrations particularly so in case of trouble in slip control.

In other control situations occurring in brake-slip and traction-slip control and in the transition range of the two types of control it is also possible to considerably improve the driving behavior by means of a short-time disengagement of the clutch. Among other situations, this applies to the start in low gear as in this case the traction torque transmitted to the driving wheels is particularly high.

What is claimed is:

1. An automatic anti-slip free-wheeling system for an automotive vehicle having at least four wheels, comprising:

respective hydraulic brake means for applying braking pressure to each of said four wheels;

a hydraulic system for actuating said brake means;

engine and power transmission means;

hydraulically actuated free-wheel control means responsive to said hydraulic system for disconnecting said transmission means;

a source of hydraulic pressure connected to said hydraulically actuated free-wheel control means, including valve means for controlling the flow of hydraulic pressure to said free wheel control means;

respective wheel velocity transducer means for sensing the angular velocity of each of said four wheels;

engine speed transducer means for sensing the rotational velocity of said engine means;

throttle position transducer means for sensing the throttle valve position of said engine means;

and anti-skid logic means responsive to all above said transducer means to actuate said valve means to cause said hydraulic system to disconnect said transmission means and to vary said brake pressure upon the occurrence of selected wheel rotational and drive-train torque conditions indicative of a wheel slip situation.

2. An automatic anti-slip free-wheeling system according to claim 1, wherein said selected wheel rotational conditions include wheel velocity, acceleration, and deceleration.

* * * * *